United States Patent
Hsu et al.

(10) Patent No.: US 11,269,246 B2
(45) Date of Patent: Mar. 8, 2022

(54) WAVELENGTH CONVERSION DEVICE AND PROJECTOR

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/828,962

(22) Filed: Mar. 25, 2020

(65) Prior Publication Data

US 2020/0310236 A1   Oct. 1, 2020

(30) Foreign Application Priority Data

Mar. 28, 2019  (CN) .......................... 201910241069.6

(51) Int. Cl.
*G03B 21/20*   (2006.01)
*G02B 26/00*   (2006.01)

(52) U.S. Cl.
CPC ......... *G03B 21/204* (2013.01); *G02B 26/008* (2013.01)

(58) Field of Classification Search
CPC .......................... G03B 21/204; G02B 26/008
See application file for complete search history.

(56) References Cited

U.S. PATENT DOCUMENTS

| 2005/0122485 A1* | 6/2005 | Kao .................... G02B 26/008 353/84 |
| 2006/0126198 A1 | 6/2006 | Niwa et al. |
| 2008/0297933 A1 | 12/2008 | Hsu et al. |

(Continued)

FOREIGN PATENT DOCUMENTS

| CN | 2497341 | 6/2002 |
| CN | 1462906 | 12/2003 |

(Continued)

OTHER PUBLICATIONS

"Office Action of China Counterpart Application", dated May 6, 2021, p. 1-p. 12.

(Continued)

*Primary Examiner* — Bryon T Gyllstrom
*Assistant Examiner* — Christopher E Dunay
(74) *Attorney, Agent, or Firm* — JCIPRNET

(57) ABSTRACT

The invention provides a wavelength conversion device and a projector. The wavelength conversion device is configured to receive an excitation beam and includes a substrate, at least one wavelength conversion material layer, a driving unit and an assembly member. The substrate has a first region and a second region disposed adjacent to each other. The at least one wavelength conversion material layer is disposed on the substrate and located in the first region and configured to convert a wavelength of the excitation beam. The driving unit includes a rotation shaft. The driving unit is connected to the substrate and configured to drive the substrate to rotate with the rotation shaft as an axial center. The assembly member is disposed on the substrate, and the substrate drives the assembly member to rotate. A thickness or a shape of the assembly member is asymmetrical in a radial direction.

18 Claims, 17 Drawing Sheets

(56) References Cited

U.S. PATENT DOCUMENTS

| | | | |
|---|---|---|---|
| 2010/0245776 A1* | 9/2010 | Yamamoto | G03B 21/204 353/38 |
| 2010/0245777 A1* | 9/2010 | Ogura | G03B 21/204 353/38 |
| 2014/0211170 A1* | 7/2014 | Kitano | H04N 9/3161 353/31 |
| 2016/0073068 A1* | 3/2016 | Miyazaki | G02B 26/008 353/31 |
| 2017/0003498 A1 | 1/2017 | Liu et al. | |
| 2017/0059979 A1 | 3/2017 | Hsu et al. | |
| 2017/0199451 A1* | 7/2017 | Akiyama | G02B 27/0961 |
| 2017/0205692 A1* | 7/2017 | Aoki | G03B 21/16 |
| 2018/0059403 A1* | 3/2018 | Takamatsu | H04N 9/3161 |
| 2018/0173085 A1* | 6/2018 | Mori | H01L 33/50 |
| 2018/0373023 A1* | 12/2018 | Fujii | G02B 26/008 |
| 2019/0171097 A1* | 6/2019 | Fujii | G03B 33/08 |
| 2019/0268576 A1* | 8/2019 | Ikeura | G03B 21/204 |

FOREIGN PATENT DOCUMENTS

| | | |
|---|---|---|
| CN | 1591163 | 3/2005 |
| CN | 1713071 | 12/2005 |
| CN | 2791698 | 6/2006 |
| CN | 1940774 | 4/2007 |
| CN | 101261346 | 9/2008 |
| CN | 101846250 | 9/2010 |
| CN | 102900807 | 7/2014 |
| CN | 103929630 | 7/2014 |
| CN | 106154702 | 11/2016 |
| CN | 104216208 | 4/2017 |
| CN | 106681092 | 5/2017 |
| CN | 108073024 | 5/2018 |
| CN | 207851496 | 9/2018 |
| CN | 207922119 | 9/2018 |
| CN | 208110248 | 11/2018 |
| CN | 208270924 | 12/2018 |
| CN | 109116667 | 1/2019 |
| CN | 109212876 | 1/2019 |
| CN | 209624967 | 11/2019 |
| JP | 2006064785 | 3/2006 |
| TW | M276227 | 9/2005 |
| TW | I579634 | 4/2017 |
| TW | I635351 | 9/2018 |

OTHER PUBLICATIONS

"Office Action of China Counterpart Application", dated Jan. 17, 2022, p. 1-p. 8.

* cited by examiner

WAVELENGTH CONVERSION DEVICE AND PROJECTOR

CROSS-REFERENCE TO RELATED APPLICATION

This application claims the priority benefit of China application serial no. 201910241069.6, filed on Mar. 28, 2019. The entirety of the above-mentioned patent application is hereby incorporated by reference herein and made a part of this specification.

BACKGROUND

Field of the Invention

The invention relates to an optical device and a projector and more particularly, to a wavelength conversion device and a projector having the wavelength conversion device.

Description of Related Art

For current laser projectors, generally, a reflective layer is formed on a metal substrate by means of coating, and a phosphor layer is applied on the reflective layer to form a phosphor wheel. Then, a laser beam emitted by a laser light source device excites the phosphor layer on the metal substrate of the phosphor wheel, so as to generate a light beam in different colors (such as green light and yellow light). In the meantime, a laser beam (e.g., blue light) may also be allowed to directly pass through the phosphor wheel with a hollow slot on the metal substrate or via a light transparent plate disposed on the metal substrate, so as to generate light with various colors.

In order to enhance a structural balance effect of the phosphor wheel, in some projectors, a balancing sheet with a uniform thickness may be additionally disposed between the metal substrate and a driver. The balancing sheet, due to having an asymmetrical appearance, may generate a resistance force and a wind shear during high-speed rotation, which further causes vibration and noise of the phosphor wheel in an optical engine. Moreover, after the balancing sheet is additionally disposed, a load centroid at a front end of the overall driver shifts forward (i.e., departs away from the driver). As a result, a rotation shaft of the driver bears an unbalanced and greater weight load, which not only affects the lifetime of the driver, but also causes larger vibration generated to the driver when rotating, and leads to greater noise generated by the mechanism of optical engine. Therefore, how to overcome the aforementioned issues is indeed one of the key points of the current research and development for those in this field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a wavelength conversion device having an assembly member. The assembly member has a thickness or a shape which is asymmetrical in a radial direction and is capable of reducing structural imbalance for the overall wavelength conversion device, thereby achieving a structural balance effect.

The invention is further directed to a projector including the aforementioned wavelength conversion device and is capable of effectively reducing noise generated by structural vibration.

The invention is directed to a wavelength conversion device having a ring-shaped assembly member. The ring-shaped assembly member and a driving unit are located at the same side of a substrate, and the ring-shaped assembly member surrounds the driving unit, thereby achieving a structural balance effect.

Other features and advantages of the invention can be further understood by the technical features disclosed in the invention.

To achieve one, part, or all of the objectives aforementioned or other objectives, a wavelength conversion device provided by an embodiment of the invention is configured to receive an excitation beam and includes a substrate, at least one wavelength conversion material layer, a driving unit and an assembly member. The substrate has a first region and a second region disposed adjacent to each other. The at least one wavelength conversion material layer is disposed on the substrate and located in the first region and configured to convert a wavelength of the excitation beam. The driving unit includes a rotation shaft. The driving unit is connected to the substrate and configured to drive the substrate to rotate with the rotation shaft as an axial center. The assembly member is disposed on the substrate, and the substrate drives the assembly member to rotate. A thickness or a shape of the assembly member is asymmetrical in a radial direction.

To achieve one, part, or all of the objectives aforementioned or other objectives, a projector provided by an embodiment of the invention includes an illumination system, a light valve and a projection lens. The illumination system is configured to provide an illumination beam and includes an excitation light source device and a wavelength conversion device. The excitation light source device is configured to provide an excitation beam. The wavelength conversion device includes a substrate, at least one wavelength conversion material layer, a driving unit and an assembly member. The substrate has a first region and a second region disposed adjacent to each other. The at least one wavelength conversion material layer is disposed on the substrate and located in the first region. The driving unit includes a rotation shaft. The driving unit is connected to the substrate and configured to drive the substrate to rotate with the rotation shaft as an axial center. The assembly member is disposed on the substrate, and the substrate drives the assembly member to rotate. A thickness or a shape of the assembly member is asymmetrical in a radial direction. The first region and the second region of the substrate are cut into a transmission path of the excitation beam in an alternate order. When the second region enters the transmission path of the excitation beam, the excitation beam is transmitted to the light valve. When the at least one wavelength conversion material layer located in the first region enters the transmission path of the excitation beam, the at least one wavelength conversion material layer converts a wavelength of the excitation beam. The illumination beam includes the excitation beam. The light valve is located on a transmission path of the illumination beam and configured to convert the illumination beam into an image beam. The projection lens is located on a transmission path of the image beam and configured to convert the illumination beam into a projection beam.

To achieve one, part, or all of the objectives aforementioned or other objectives, a wavelength conversion device provided by an embodiment of the invention is configured to receive an excitation beam. The wavelength conversion device includes a substrate, at least one wavelength conversion material layer, a driving unit and a ring-shaped assembly member. The substrate has a first region and a second region disposed adjacent to each other. The at least one wavelength conversion material layer is disposed on the substrate and located in the first region and configured to convert a wavelength of the excitation beam. The driving unit includes a rotation shaft. The driving unit is connected to the substrate and configured to drive the substrate to rotate with the rotation shaft as an axial center. The ring-shaped assembly member is disposed on the substrate and located together with the driving unit on the same side of the substrate. The ring-shaped assembly member is disposed coaxially with the axial center of the driving unit, and the ring-shaped assembly member surrounds the driving unit.

Based on the above, the embodiments of the invention achieve at least one of the following advantages or effects. In the wavelength conversion device of the invention, the thickness or the shape of the assembly member is asymmetrical in the radial direction. Accordingly, the structural balance effect can be achieved without any known balancing sheet additionally disposed. In addition, since the disposition of the balancing sheet is unnecessary, the structure centroid of the wavelength conversion device can be closer to the center of the rotation shaft of the driving unit to reduce noise and wind resistance during high-speed rotation, such that the lifetime of the driving unit can be increased.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
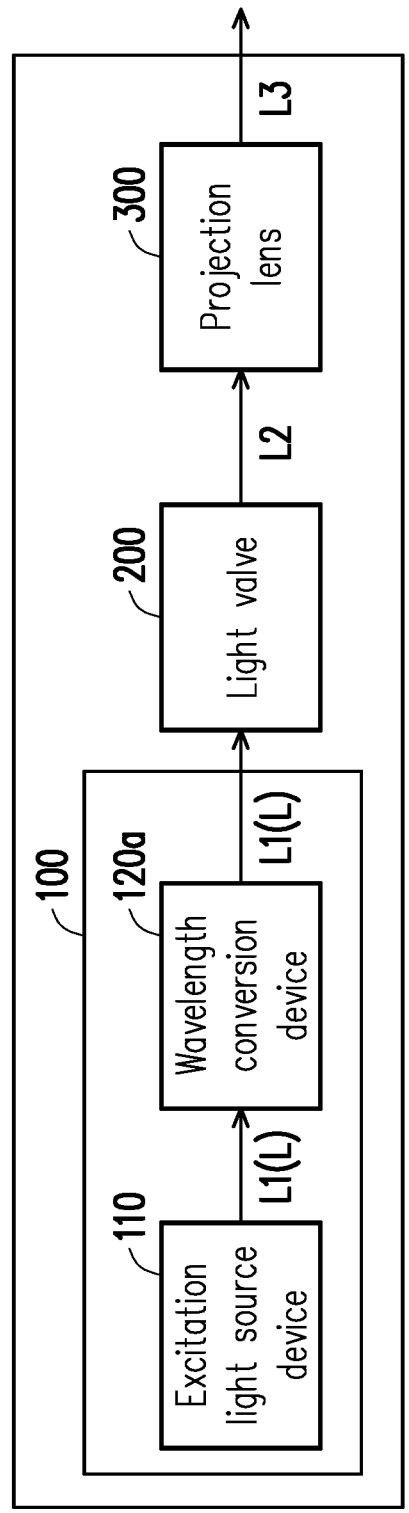
FIG. 1 is a schematic diagram illustrating a projector according to an embodiment of the invention.

FIG. 1 is a schematic diagram illustrating a projector according to an embodiment of the invention. Referring to FIG. 1, a projection apparatus 10 of the present embodiment includes an illumination system 100, a light valve 200 and a projection lens 300. The illumination system 100 is configured to provide an illumination beam L. The illumination system 100 includes an excitation light source device 110 and a wavelength conversion device 120a. The excitation light source device 110 is, for example, a laser source and configured to provide an excitation beam L1. The wavelength conversion device 120a is, for example, a phosphor wheel and configured to receive the excitation beam L1. The wavelength conversion device 120a is disposed on a transmission path of the excitation beam L1 and configured to convert a wavelength of the excitation beam L1 to generate a conversion beam having different wavelengths. In this case, the illumination beam L includes the excitation beam L1 and the conversion beam. The light valve 200 is disposed on a transmission path of the illumination beam L and configured to modulate the illumination beam L into an image beam L2. The projection lens 300 is disposed on a transmission path of the image beam L2 and configured to convert the image beam L2 into a projection beam L3.

Furthermore, the excitation light source device 110 used in the present embodiment is, for example, a laser diode (LD), such as a laser diode bank. Specifically, any light sources which meet volume requirements in an actual design may be implemented, and the invention is not limited in this regard. The light valve 200 is a reflective optical modulator, for example, a liquid crystal on silicon (LCoS) panel or a digital micro-mirror device (DMD). In an embodiment, the light valve 200 may also be a transmissive optical modulator, for example, a transparent liquid crystal panel, an electro-optical modulator, a magneto-optic modulator or an acousto-optic modulator (AOM), but the aspect and the type of the light valve 200 are not particularly limited in the invention. Regarding a method of the light valve 200 for modulating the illumination light beam L (including the excitation light beam L1 and the conversion beam) into the image beam L2, teaching, suggestion and implementation instructions with respect to the detailed steps and the implementation thereof may be obtained based on the common knowledge in the technical field and thus, will not be repeated. Additionally, the projection lens 300 includes, for example, a combination of one or more optical lenses having diopters, for example, various kinds of combinations of non-planar lenses, such as bi-concave lenses, lenticular lenses, meniscus lenses, convex-concave lenses, plano-convex lenses, and plano-concave lenses. In an embodiment, the projection lens 300 may also include a planar optical lens for converting the image beam from the light valve 200 into the projection beam in a reflection or a transmission manner and projecting the projection beam out of the projector. In this case, the aspect and the type of the projection lens 300 are not particularly limited in the invention.

Figure 2A:
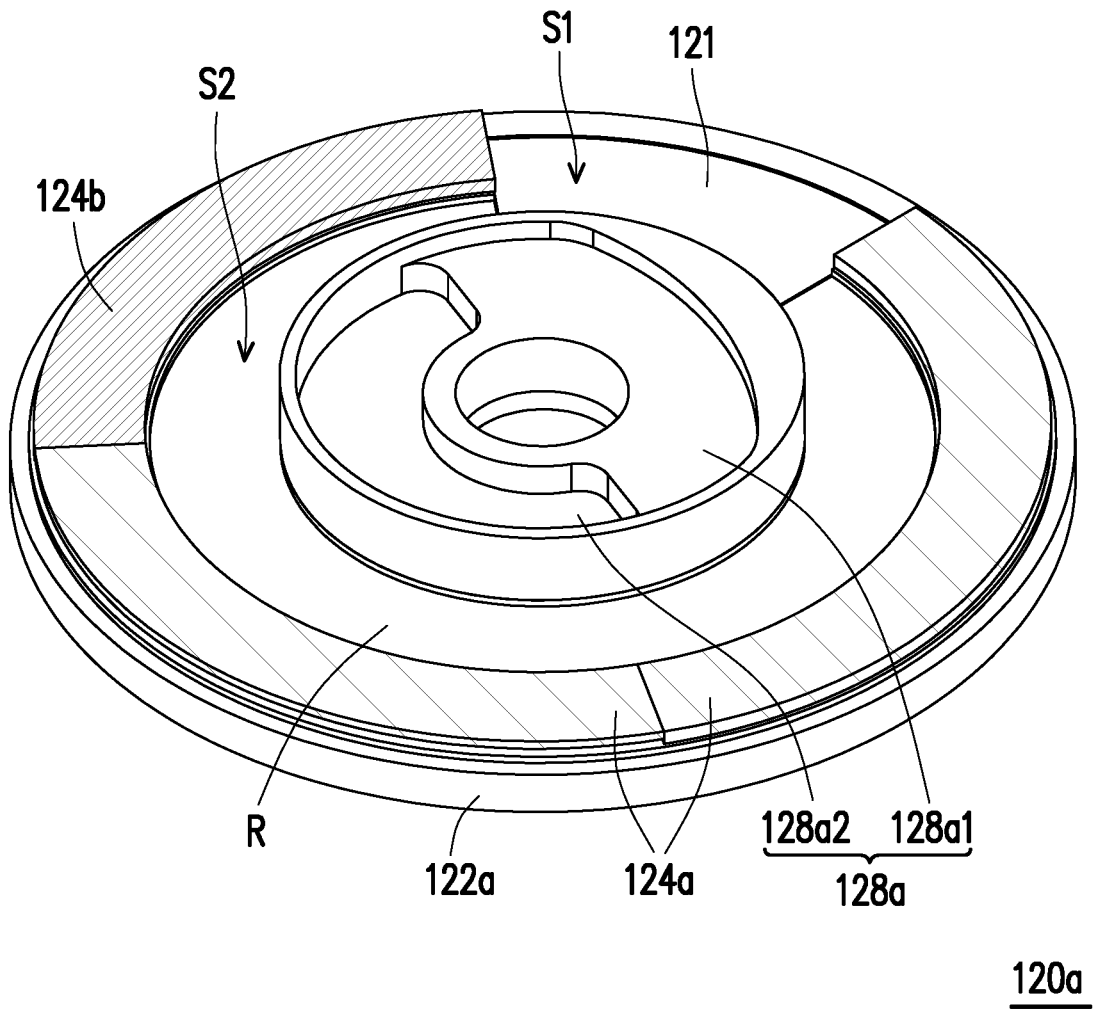
FIG. 2A is a stereoscopic diagram illustrating the wavelength conversion device depicted in FIG. 1.
Figure 2B:
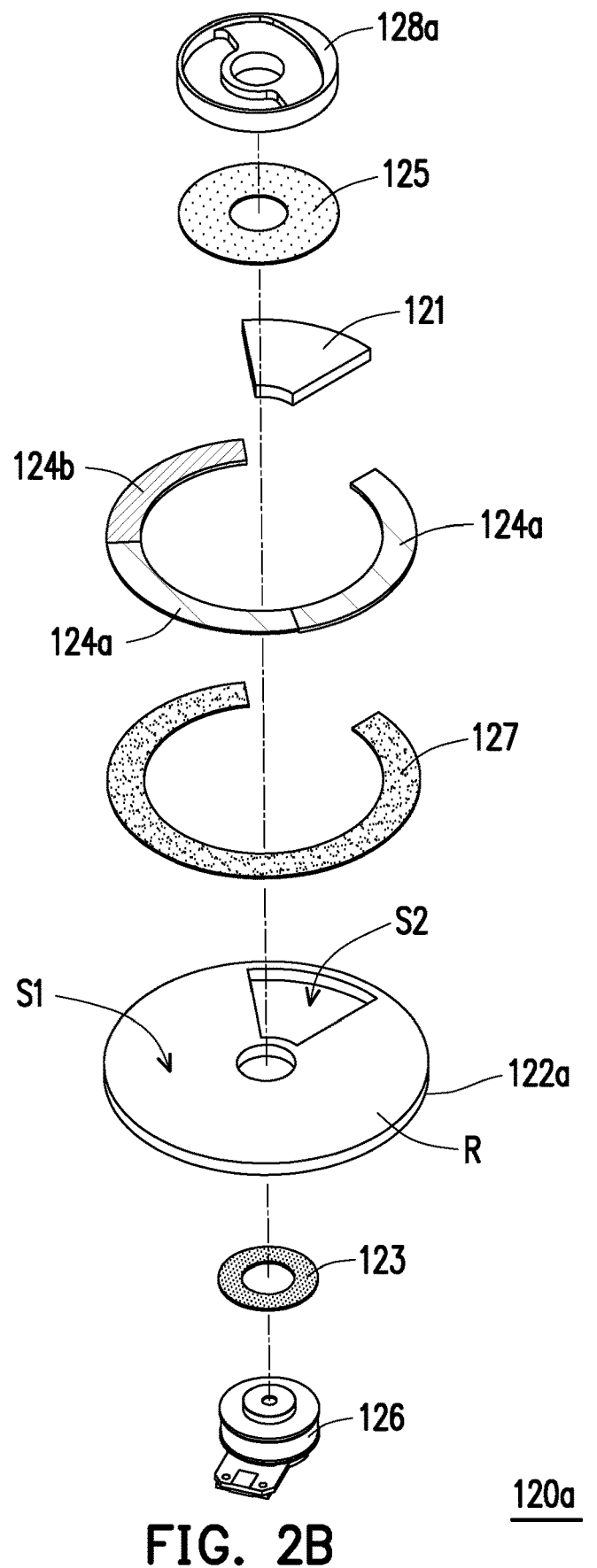
FIG. 2B is a stereoscopic exploded diagram illustrating the wavelength conversion device depicted in FIG. 2A.
Figure 2C:
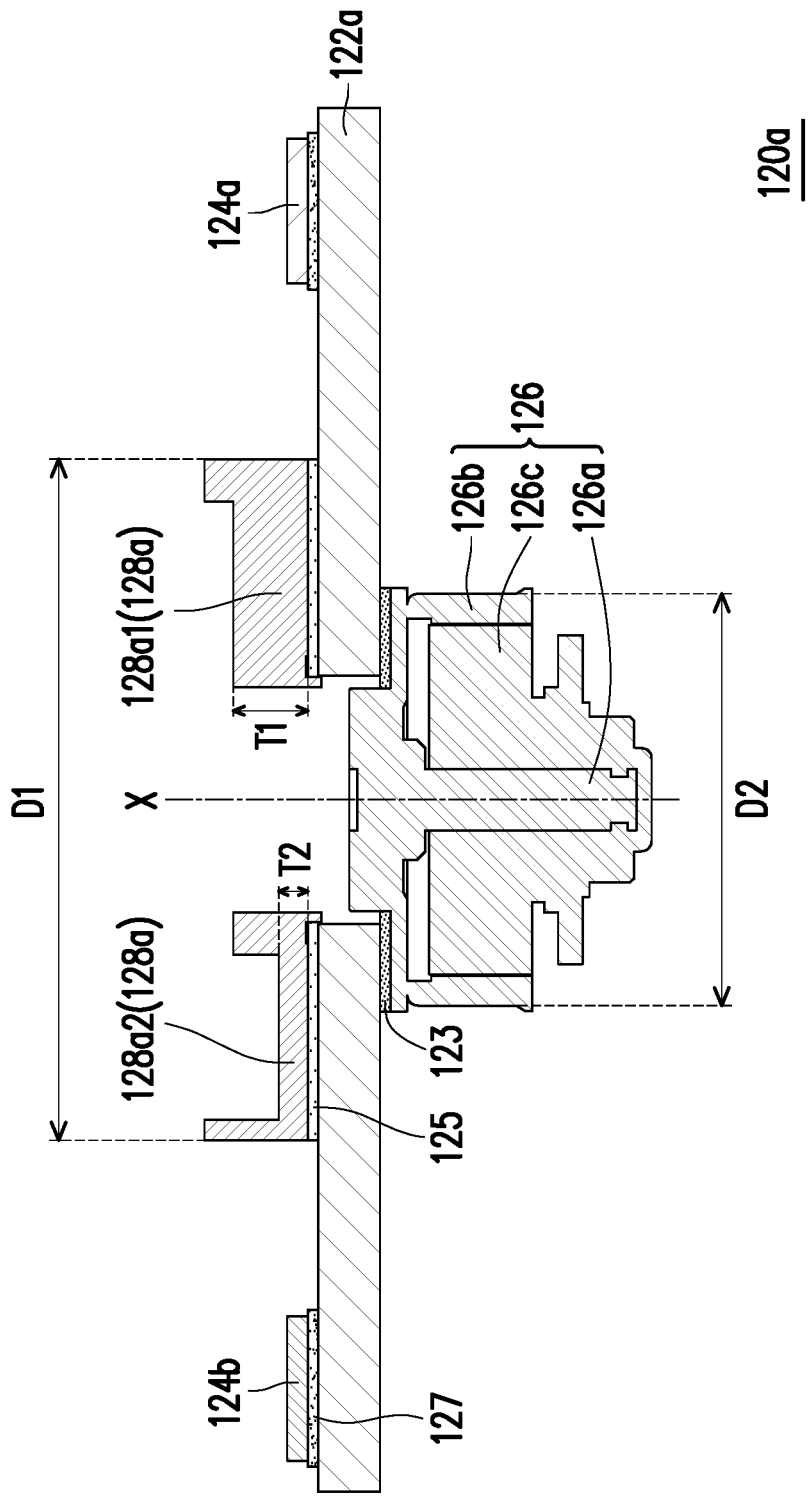
FIG. 2C is a cross-sectional diagram illustrating the wavelength conversion device depicted in FIG. 2A.

FIG. 2A is a stereoscopic diagram illustrating the wavelength conversion device depicted in FIG. 1. FIG. 2B is a stereoscopic exploded diagram illustrating the wavelength conversion device depicted in FIG. 2A. FIG. 2C is a cross-sectional diagram illustrating the wavelength conversion device depicted in FIG. 2A. Referring to FIG. 2A, FIG. 2B and FIG. 2C simultaneously, the wavelength conversion device 120a of the present embodiment includes a substrate 122a, at least one wavelength conversion material layer (schematically illustrated as including two first wavelength conversion material layers 124a and one second wavelength conversion material layer 124b), a driving unit 126 and an assembly member 128a. In detail, the substrate 122a is, for example, a metal substrate having a first region S1, a second region S2 and a reflective surface R, the first region S1 and the second region S2 are disposed adjacent to each other, the first region S1 is a wavelength conversion region of the excitation beam, and the second region S2 is a non-wavelength conversion region. In this case, the second region S2 of the substrate 122a is embodied as a hollow opening. Thus, the wavelength conversion device 120a of the present embodiment may further include a light transparent plate 121, the light transparent plate 121 is disposed in the second region S2 of the substrate 122a to be defined with the substrate 122a as a disc shape. In this case, a material of the light transparent plate 121 is different from a material of the substrate 122a, and the first region S1 and the second region S2 of the substrate 122a are cut into the transmission path of the excitation light beam L1 illustrated in FIG. 1 in an alternate order.

All of the first wavelength conversion material layers 124a and the second wavelength conversion material layer 124b of the present embodiment are, for example, phosphor layers and disposed on the reflective surface R of the substrate 122a and located in the first region S1. The first wavelength conversion material layers 124a and the second wavelength conversion material layer 124b are used to convert the wavelength of the excitation beam L1 illustrated in FIG. 1 and respectively generate conversion beams having different wavelengths. The driving unit 126 is, for example, a motor and includes a rotation shaft 126a, a rotor 126b and a stator 126c. The rotor 126b and the rotation shaft 126a of the driving unit 126 are simultaneously rotated relative to the stator 126c, the substrate 122a is fixed to the rotor 126b of the driving unit 126, and the substrate 122a is driven by the rotor 126b to rotate with the rotation shaft 126a as an axial center. In brief, the driving unit 126 of the present embodiment is connected to the substrate 122a and configured to drive the substrate 122a to rotate with the rotation shaft as an axial center X. In this case, the first wavelength conversion material layers 124a and the second wavelength conversion material layers 124b are located on a side of the substrate 122a opposite to a side on which the driving unit 126 is located.

The substrate 122a, when being rotated, may drive the first wavelength conversion material layers 124a and the second wavelength conversion material layer 124b located in the first region S1 and the light transparent plate 121 located in the second region S2 to alternately move onto the transmission path of the excitation beam L1 illustrated in FIG. 1. When the light transparent plate 121 located in the second region S2 enters the transmission path of the excitation beam L1, the excitation light beam L1 penetrates the light transparent plate 121 and is transmitted to the light valve 200. When the first wavelength conversion material layers 124a and the second wavelength conversion material layer 124b located in the first region S1 alternately enter the transmission path of the excitation beam L1 illustrated in FIG. 1, the first wavelength conversion material layers 124a and the second wavelength conversion material layer 124b convert the wavelength of the excitation beam L1. In this case, the first wavelength conversion material layers 124a are configured to convert the excitation beam L1 into a first conversion beam (e.g., yellow light) having a first wavelength, and the second wavelength conversion material layers 124b is configured to convert the excitation beam L1 into a second conversion beam (e.g., green light) having a second wavelength, the first wavelength is different from the second wavelength. The excitation beam L1 illustrated in FIG. 1 may directly pass through the substrate 122a via the second region S2 on the substrate 122a. In addition, the first conversion beam (yellow light) and the second conversion beam (green light) may be reflected by the reflective surface R of the substrate 122a and transmitted to other optical components of the illumination system 100, so as to combined with the excitation beam L1 (blue light) penetrating the substrate 122a to form the illumination beam L). In this way, the excitation beam L1 illustrated in FIG. 1 passing through the wavelength conversion device 122a may generate the conversion beam in various colors.

Furthermore, the assembly member 128a of the present embodiment is disposed on the substrate 122a, and the substrate 122a drives the assembly member 128a to rotate. In this case, the assembly member 128a and the driving unit 126 are respectively located on two opposite sides of the substrate 122a, such that the substrate 122a may be firmly sandwiched between the assembly member 128a and the driving unit 126. Particularly, a thickness of the assembly member 128a of the present embodiment is asymmetrical in a radial direction, the radial direction is perpendicular to an extension direction of the axial center X. The assembly member 128a has asymmetrical imbalance greater than 30 mg, the asymmetrical imbalance refers to that the assembly member 128a in a region having a greater load relative to the substrate 122a is increased by more than 30 mg for the overall device to achieve balance. Specifically, a shape of the assembly member 128a of the present embodiment is a hollow-ring shape and is disposed coaxially with the axial center X of the driving unit 126. The assembly member 128a at least has a first part 128a1 and a second part 128a2, a first thickness T1 of the first part 128a1 of the assembly member 128a in the radial direction is greater than a second thickness T2 of the second part 128a2 in the radial direction. Namely, the shape of the assembly member 128a is axisymmetric, but the thickness of the assembly member 128a is asymmetrical in the radial direction, the thickness of the assembly member 128a refers to a distance between two opposite surfaces of the driving unit 126 in the extension direction of the axial center X. In comparison with the first region S1 of the substrate 122a on which the first wavelength conversion material layers 124a and the second wavelength conversion material layer 124b are located, the second region S2 of the substrate 122a has a smaller load, and thus, an orthographic projection of the first part 128a1 of the assembly member 128a on the substrate 122a overlaps with a part of the light transparent plate 121, thereby achieving a structural balance effect. In this case, an outer diameter D1 of the substrate 128a is greater than an outer diameter D2 of the driving unit 126. In other embodiments that are not shown, an inner diameter of the assembly member may also be equal to the outer diameter of the driving unit, which still falls within the scope sought for protection by the invention. The assembly member 128a is made of, for example, metal, plastic or ceramic, which is not particularly limited in invention.

Moreover, referring again to FIG. 2B and FIG. 2C simultaneously, the wavelength conversion device 120a further include adhesion layers 123, 125 and 127. The adhesion layer 123 is disposed between the driving unit 126 and the substrate 122a, the adhesion layer 123 is directly connected to the driving unit 126 and the substrate 122a. The adhesion layer 125 is disposed between the assembly member 128a and the substrate 122a, the adhesion layer 125 is directly connected to the assembly member 128a and the substrate 122a. The adhesion layer 127 is disposed between the first wavelength conversion material layers 124a and the substrate 122a and between the second wavelength conversion material layer 124b and the substrate 122a, and the adhesion layer 127 is directly connected to the first wavelength conversion material layers 124a with the substrate 122a and directly connected to the second wavelength conversion material layer 124b with the substrate 122a.

In brief, in the wavelength conversion device 120a of the present embodiment, the thickness of the assembly member 128a is asymmetrical in the radial direction. Accordingly, the structural balance effect may be achieved without any known balancing sheet additionally disposed, and thus, the noise and the wind resistance may be reduced during high-speed rotation. Furthermore, as the balancing sheet is unnecessarily disposed in the present embodiment, manufacturing cost and structure complexity of the wavelength conversion device 120a may be reduced. Moreover, a structure centroid of the wavelength conversion device 120a may be closer to the center of the rotation shaft 126a of the driving unit 126 in the presence of the structure of the assembly member 128a of the present embodiment, such that the driving unit 126 may have an extended lifetime and lower noise generated.

It should be noted that the reference numerals and a part of the contents in the previous embodiment are used in the following embodiments, in which identical reference numerals indicate identical or similar components, and repeated description of the same technical contents is omitted. The description related to the omitted parts can be found in the previous embodiment, and no repeated description is contained in the following embodiments.

Figure 3A:
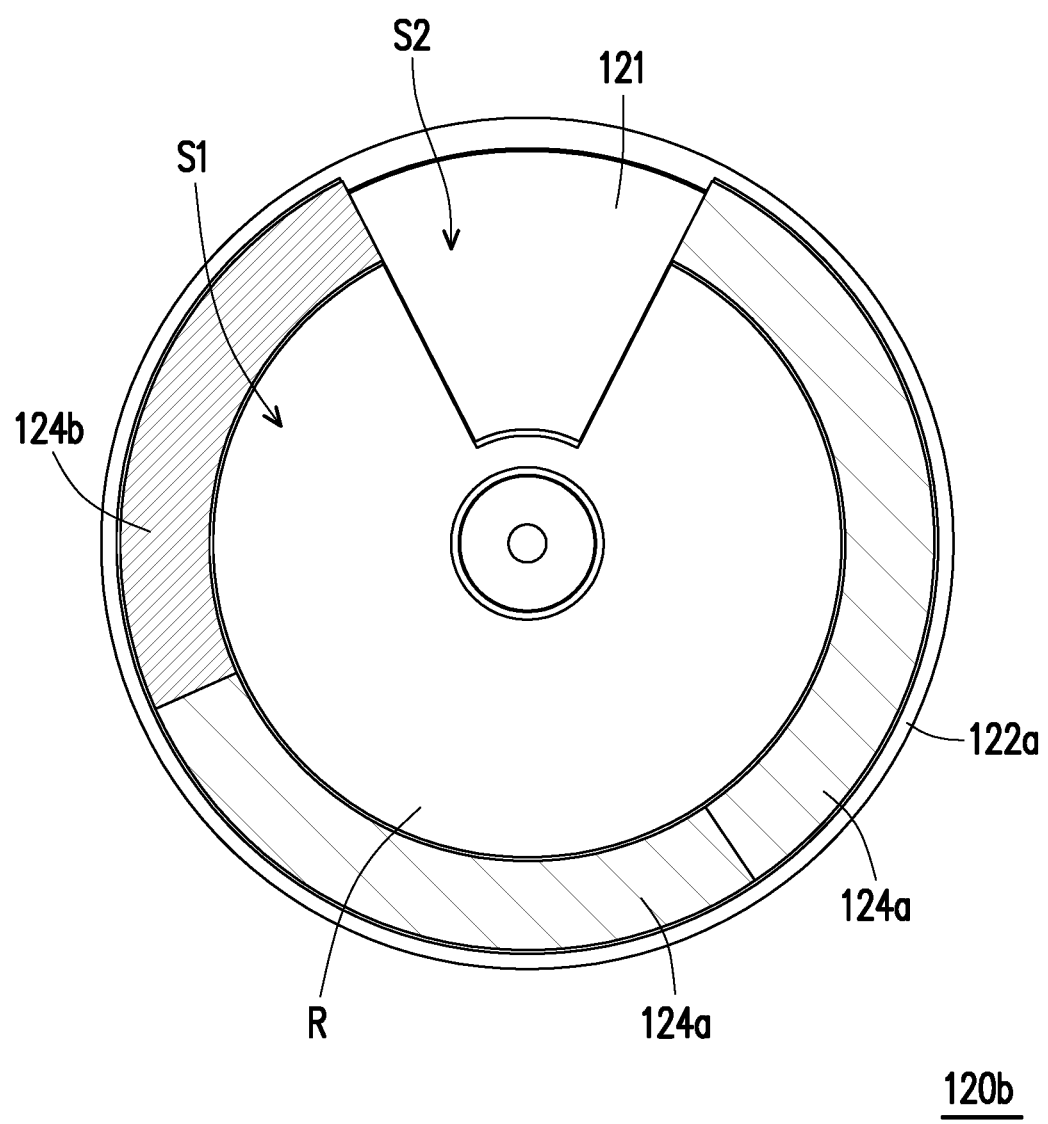
FIG. 3A is a front-view diagram illustrating a wavelength conversion device according to an embodiment of the invention.
Figure 3B:
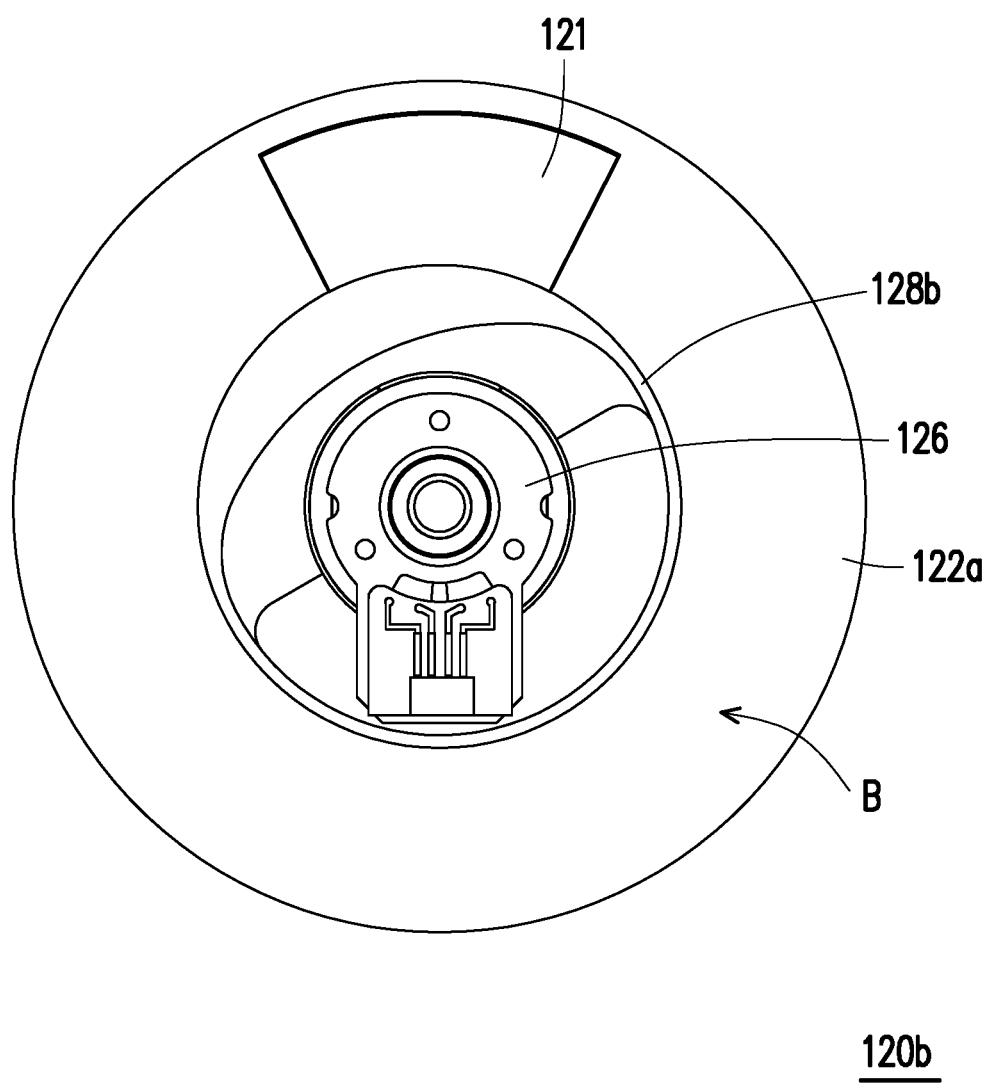
FIG. 3B is a rear-view diagram illustrating the wavelength conversion device depicted in FIG. 3A.
Figure 3C:
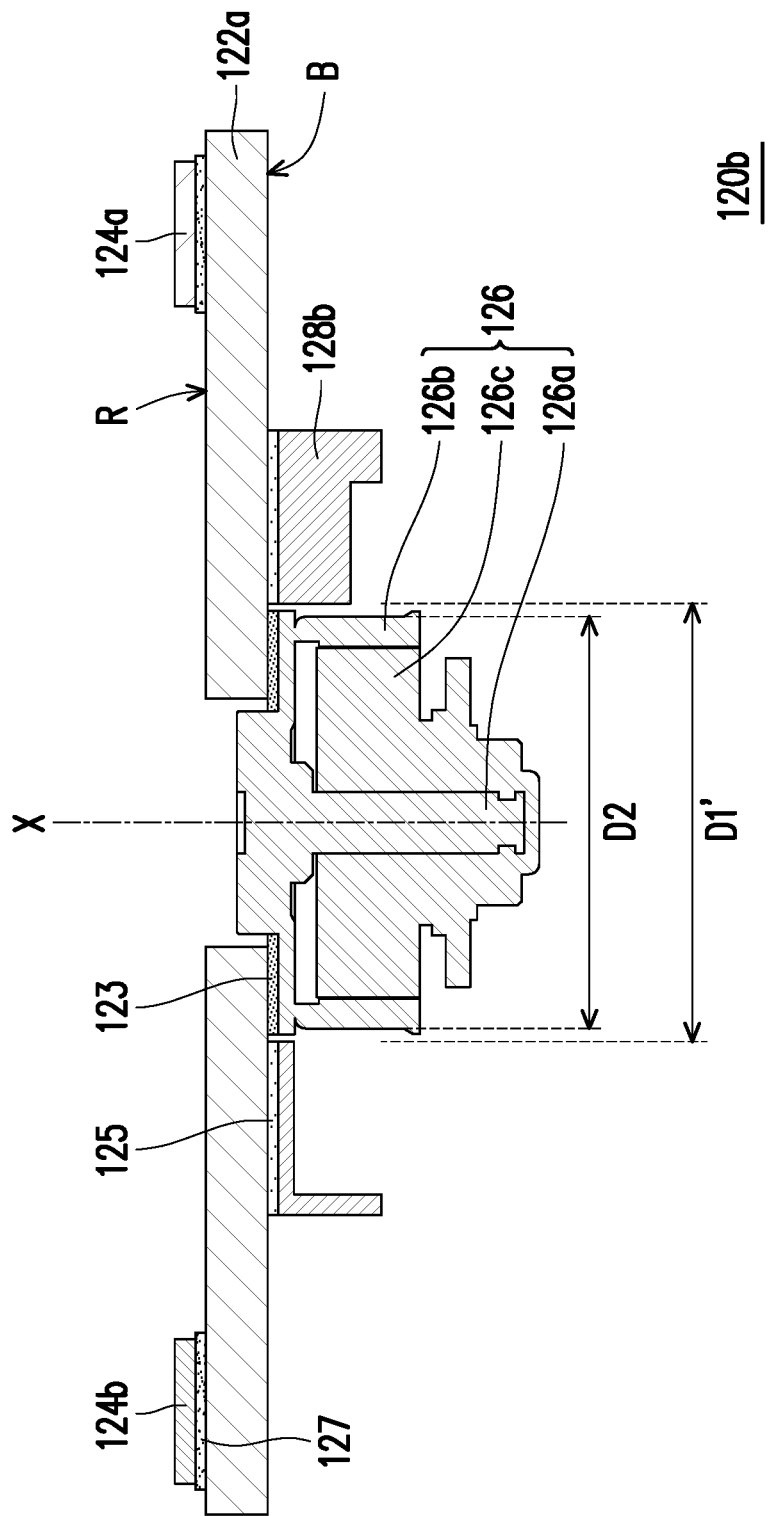
FIG. 3C is a cross-sectional diagram illustrating the wavelength conversion device depicted in FIG. 3A.

FIG. 3A is a front-view diagram illustrating a wavelength conversion device according to an embodiment of the invention. FIG. 3B is a rear-view diagram illustrating the wavelength conversion device depicted in FIG. 3A. FIG. 3C is a cross-sectional diagram illustrating the wavelength conversion device depicted in FIG. 3A. Referring to FIG. 2C and FIG. 3C simultaneously first, a wavelength conversion device 120b of the present embodiment is similar to the wavelength conversion device 120a illustrated in FIG. 2C, and the difference between the two embodiments lies in that an assembly member 128b and the driving unit 126 are located on the same side of the substrate 122a in the present embodiment, and both the driving unit 126 and the assembly member 128b are fixed to the substrate 122a. In detail, referring to FIG. 3A, FIG. 3B and FIG. 3C simultaneously, the assembly member 128b of the present embodiment is not located on the reflective surface R of the substrate 122a, but located together with the driving unit 126 on a bottom surface B opposite to the reflective surface R. In this case, an inner diameter D1' of the assembly member 128b is greater than the outer diameter D2 of the driving unit 126. In other embodiments that are not shown, the inner diameter of the assembly member may also be equal to the outer diameter of the driving unit, which still falls within the scope sought for protection by the invention.

Figure 4A:
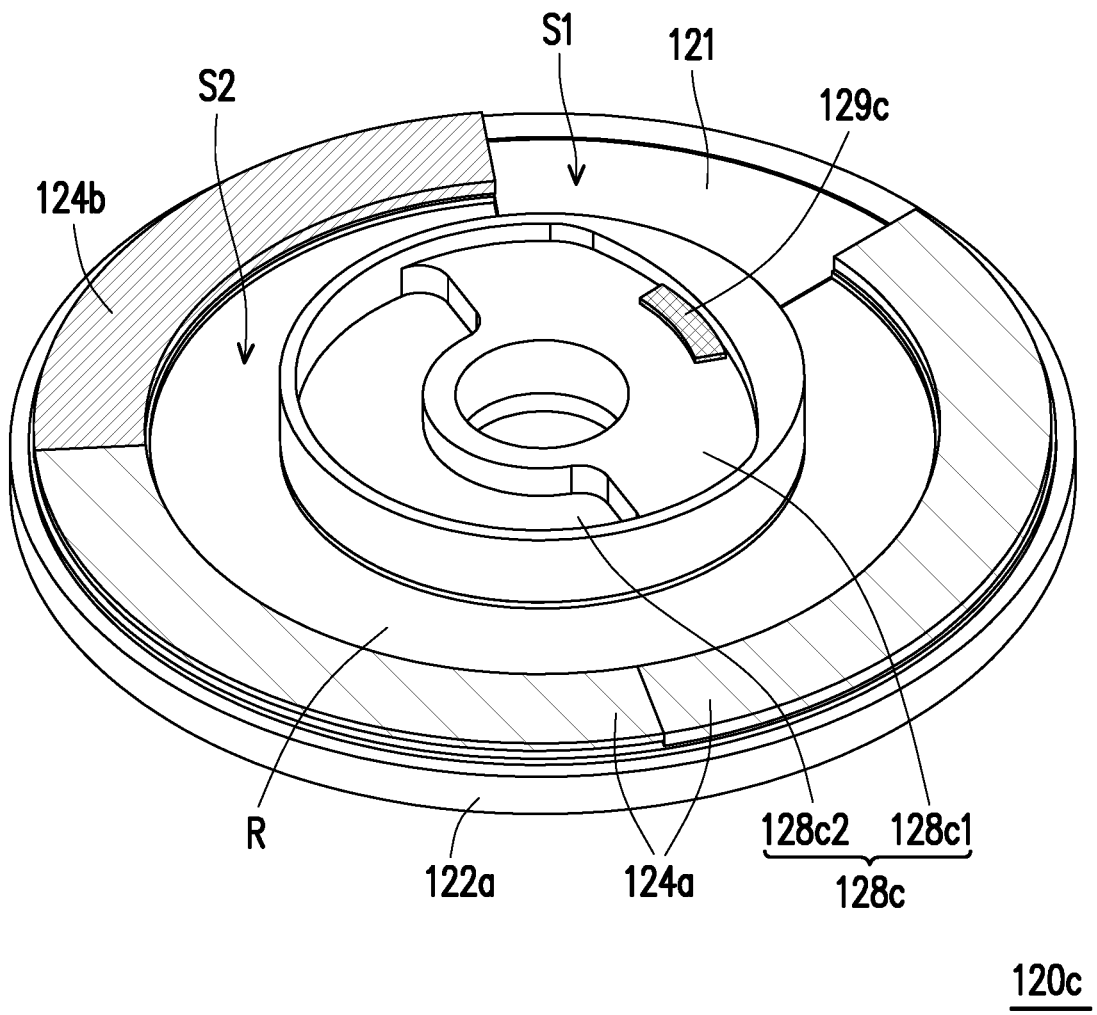
FIG. 4A is a stereoscopic diagram illustrating a wavelength conversion device according to another embodiment of the invention.
Figure 4B:
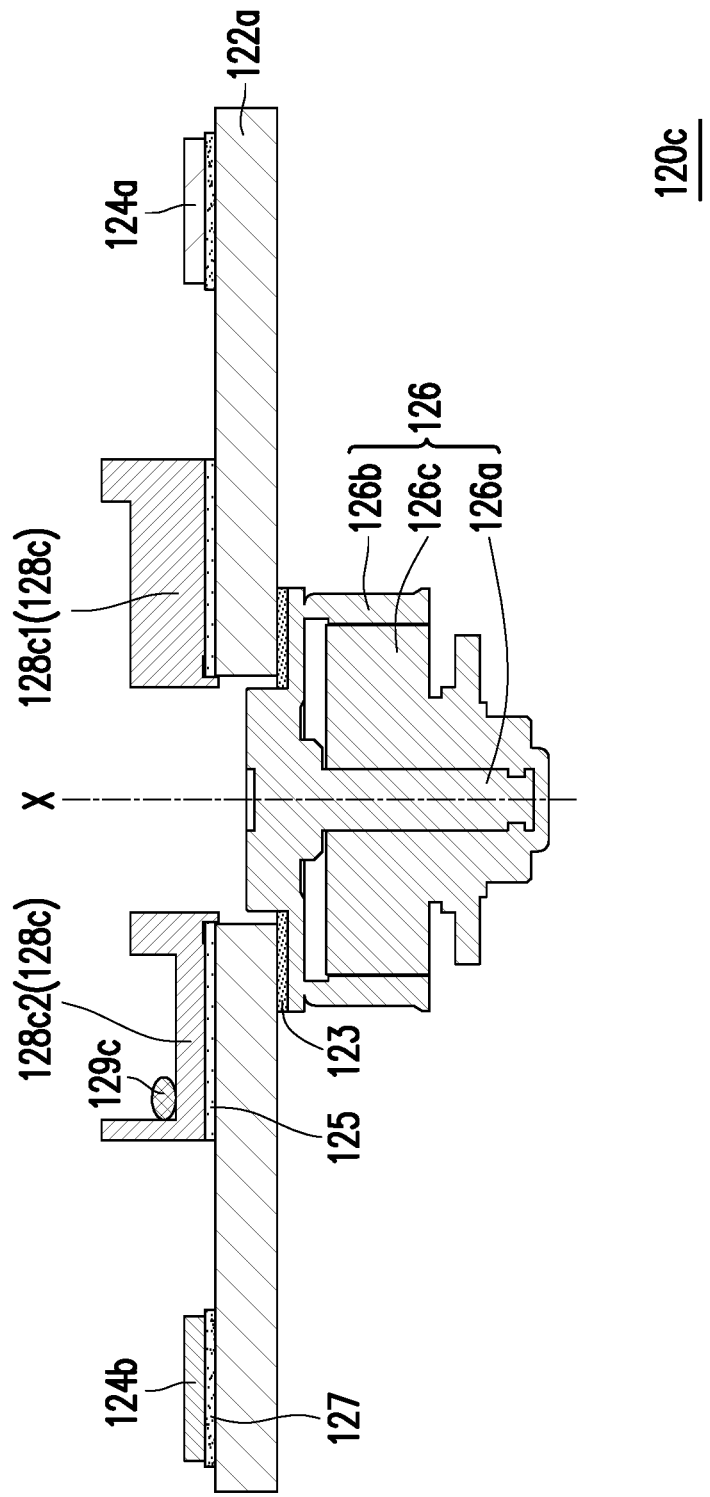
FIG. 4B is a cross-sectional diagram illustrating the wavelength conversion device depicted in FIG. 4A.

FIG. 4A is a stereoscopic diagram illustrating a wavelength conversion device according to another embodiment of the invention. FIG. 4B is a cross-sectional diagram illustrating the wavelength conversion device depicted in FIG. 4A. Referring to FIG. 2C, FIG. 4A and FIG. 4B simultaneously first, a wavelength conversion device 120c of the present embodiment is similar to the wavelength conversion device 120a illustrated in FIG. 2C, and the difference between the two embodiments lies in that the wavelength conversion device 120c of the present embodiment may further include a filler 129c, and the filler 129c is disposed on an assembly member 128c, such that the structural balance of the wavelength conversion device 120c may be more accurate.

Furthermore, in the present embodiment, in comparison with the first region S1 of the substrate 122a on which the first wavelength conversion material layers 124a and the second wavelength conversion material layer 124b are located, the second region S2 of the substrate 122a has a smaller load, and thus, an orthographic projection of a first part 128c1 of the assembly member 128c and the filler 129c on the substrate 122a overlaps with a part of the light transparent plate 121, thereby achieving a structural balance effect. Certainly, in other embodiments, the filler 129c may also be disposed on a second part 128c2 of the assembly member 128c according to a requirement for balancing, which still falls within the scope sought for protection by the invention.

Figure 5A:
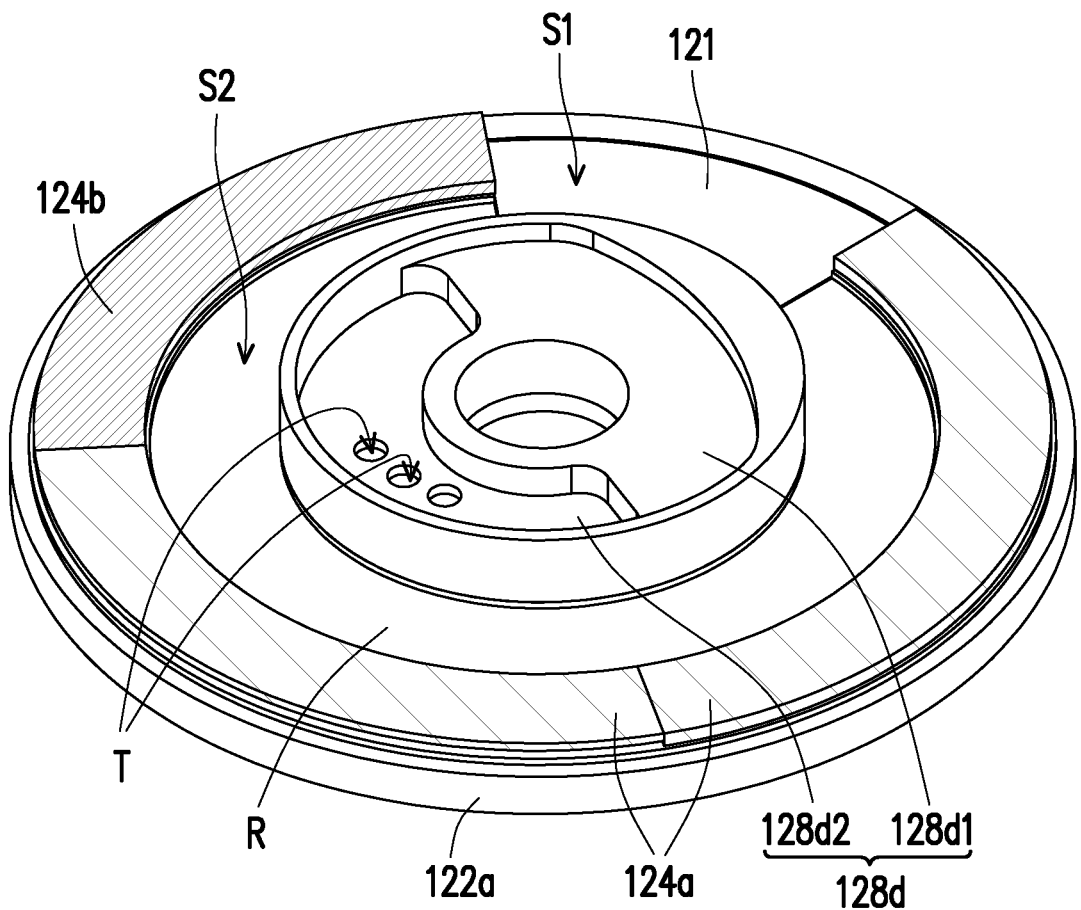
FIG. 5A is a stereoscopic diagram illustrating a wavelength conversion device according to another embodiment of the invention.
Figure 5B:
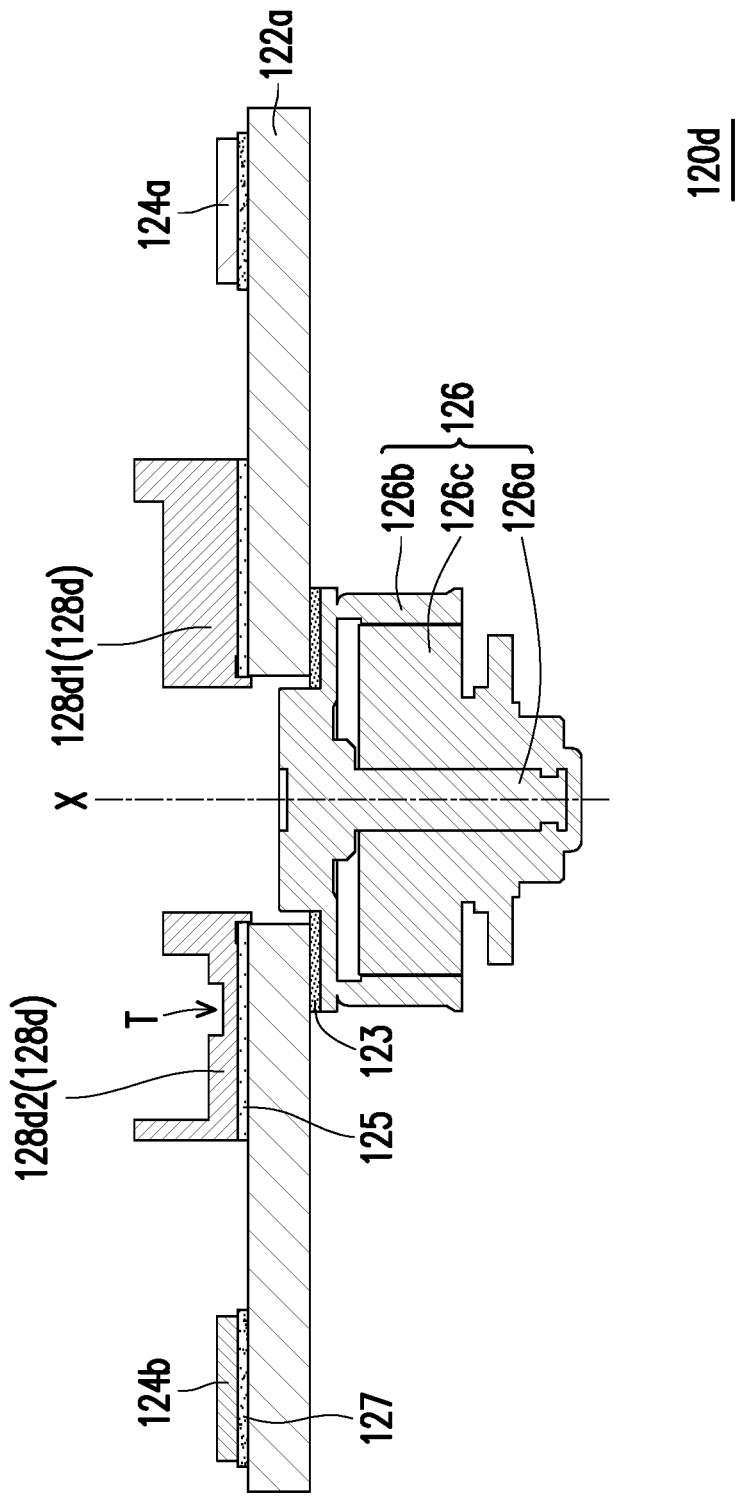
FIG. 5B is a cross-sectional diagram illustrating the wavelength conversion device depicted in FIG. 5A.

FIG. 5A is a stereoscopic diagram illustrating a wavelength conversion device according to another embodiment of the invention. FIG. 5B is a cross-sectional diagram illustrating the wavelength conversion device depicted in FIG. 5A. Referring to FIG. 2C, FIG. 5A and FIG. 5B simultaneously first, a wavelength conversion device 120d of the present embodiment is similar to the wavelength conversion device 120a illustrated in FIG. 2C, and the difference between the two embodiments lies in that a second part 128d2 of an assembly member 128d of the present embodiment has at least one through hole (schematically illustrated as three through holes T), such that the structural balance of the wavelength conversion device 120d may be more accurate.

Furthermore, in the present embodiment, in comparison with the first region S1 of the substrate 122a on which the first wavelength conversion material layers 124a and the second wavelength conversion material layer 124b are located, the second region S2 of the substrate 122a has a smaller load, and thus, the load of the first region S1 of the substrate 122a may be reduced though the through holes T, thereby achieving a structural balance effect. Certainly, in other embodiments, the through holes T may also be disposed on a first part 128d1 of the assembly member 128d according to a requirement for balancing, which still falls within the scope sought for protection by the invention.

Figure 6A:
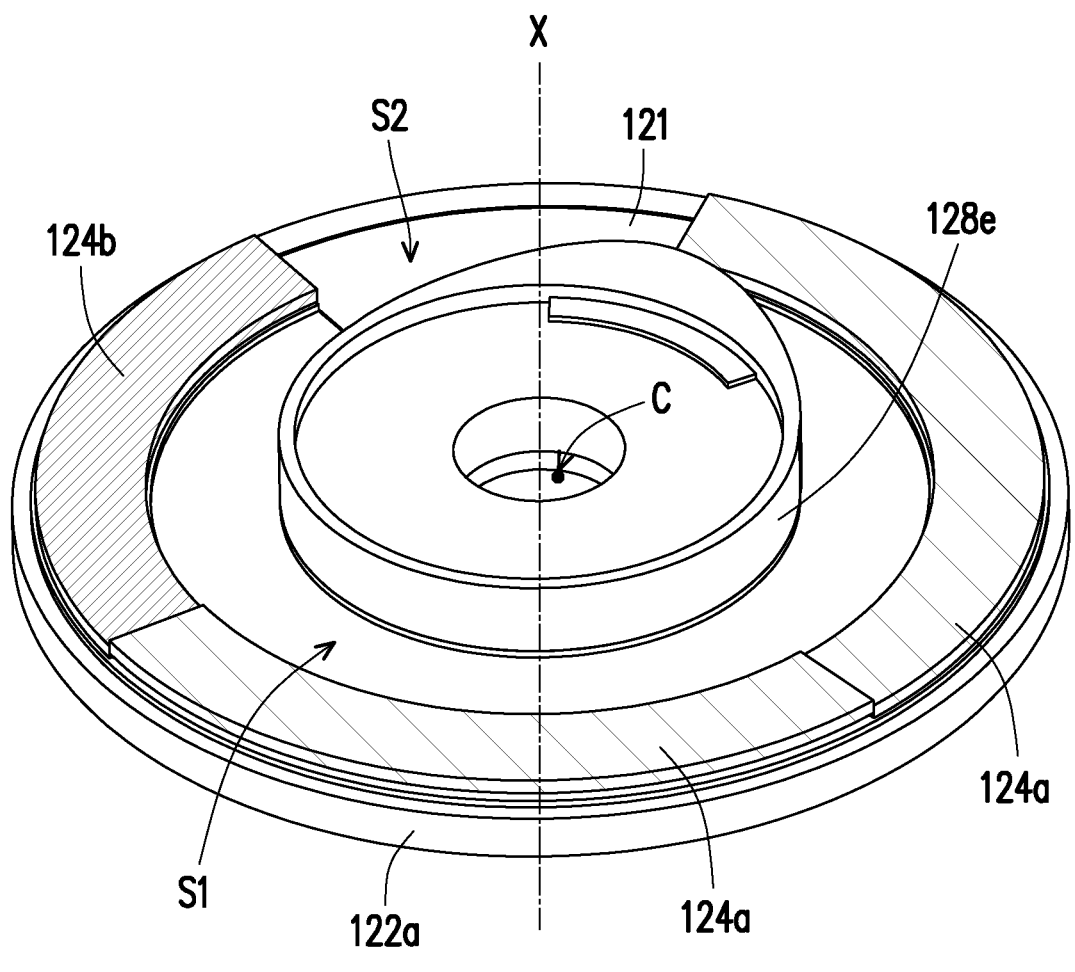
FIG. 6A is a stereoscopic diagram illustrating a wavelength conversion device according to an embodiment of the invention.
Figure 6B:
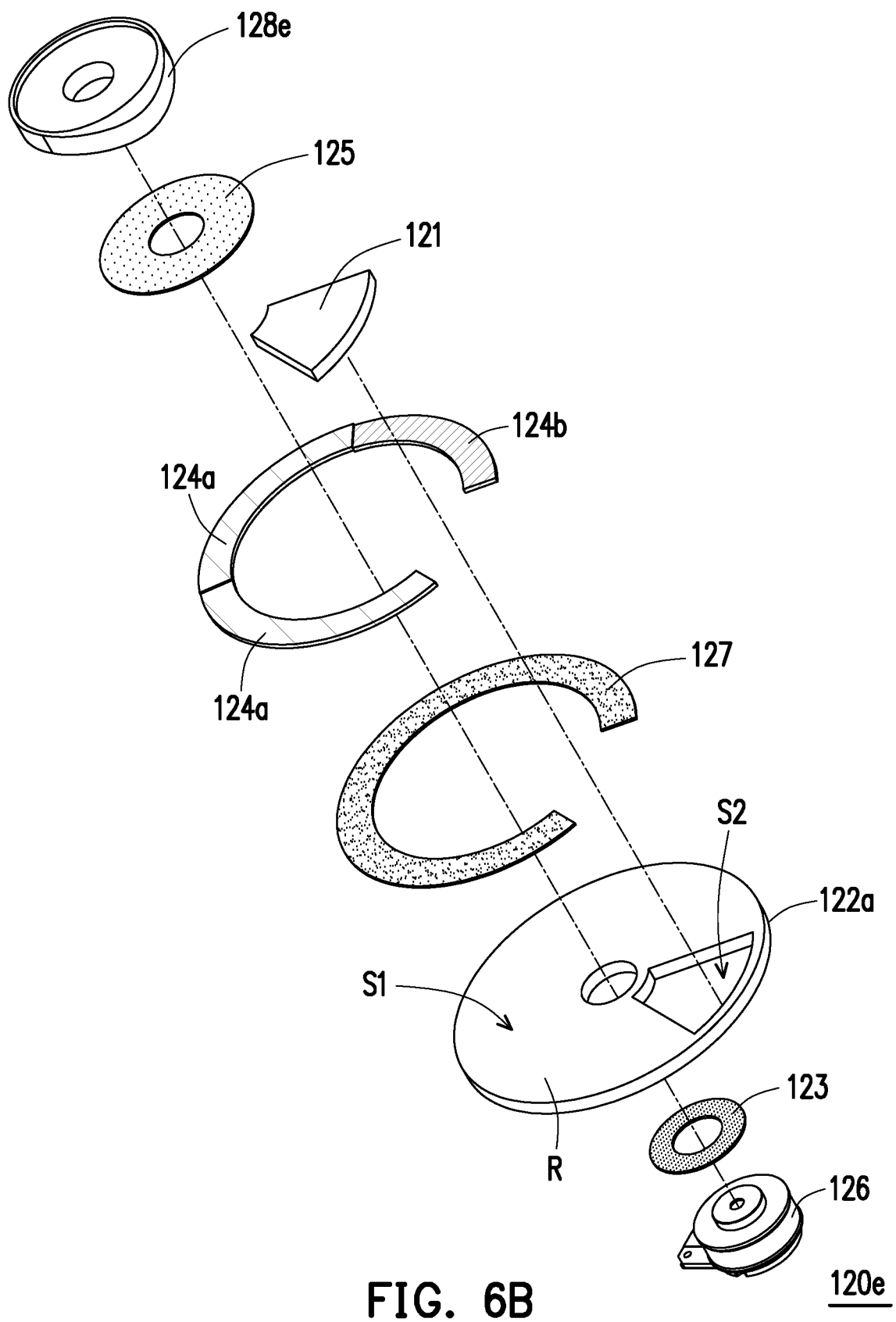
FIG. 6B is a stereoscopic exploded diagram illustrating the wavelength conversion device depicted in FIG. 6A.
Figure 6C:
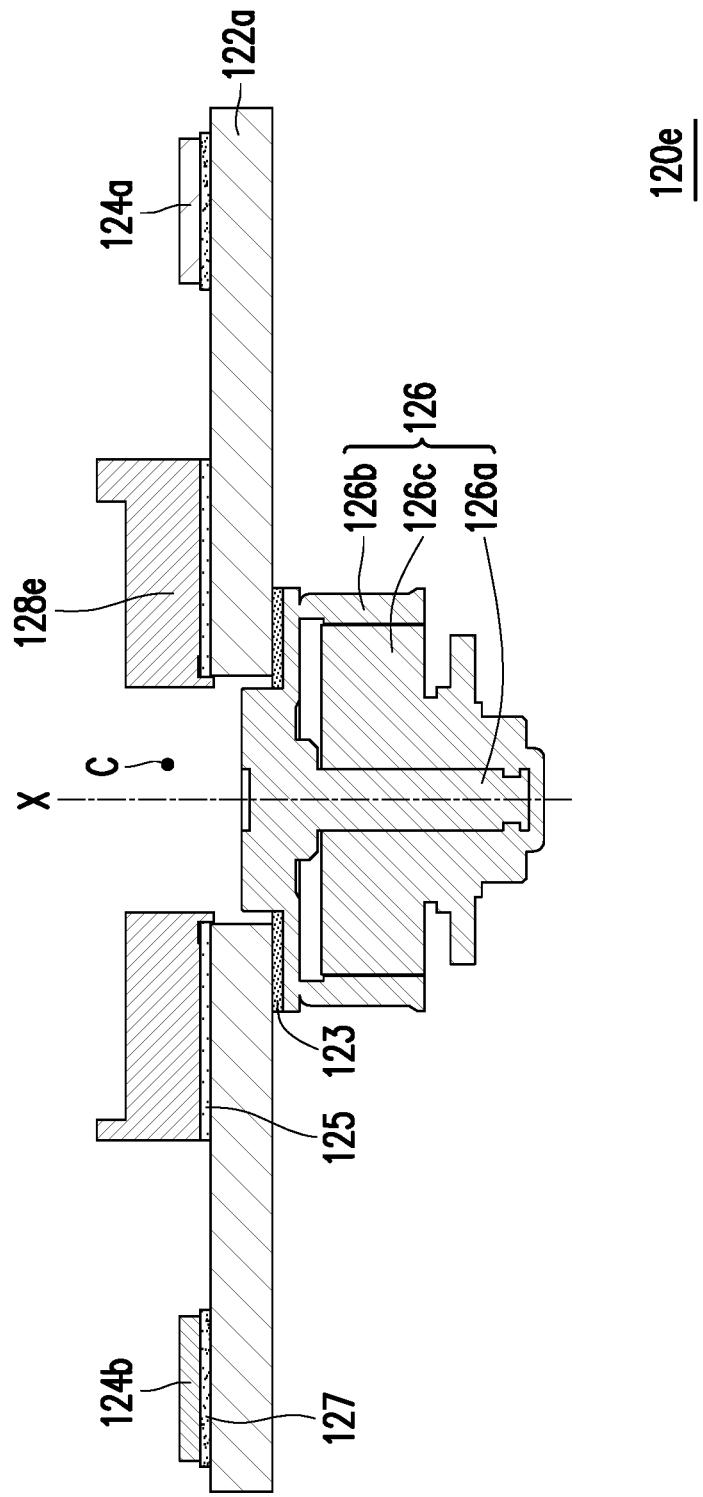
FIG. 6C is a cross-sectional diagram illustrating the wavelength conversion device depicted in FIG. 6A.

FIG. 6A is a stereoscopic diagram illustrating a wavelength conversion device according to an embodiment of the invention. FIG. 6B is a stereoscopic exploded diagram illustrating the wavelength conversion device depicted in FIG. 6A. FIG. 6C is a cross-sectional diagram illustrating the wavelength conversion device depicted in FIG. 6A. Referring to FIG. 2A, FIG. 6A, FIG. 6B and FIG. 6C simultaneously first, a wavelength conversion device 120e of the present embodiment is similar to the wavelength conversion device 120a illustrated in FIG. 2A, and the difference between the two embodiments lies in that a shape of an assembly member 128e of the present embodiment is asymmetrical in the radial direction, a center C of the assembly member 128e (e.g., a centroid of the assembly member 128e) deviates from the axial center of the driving unit 126 (the rotation shaft 126a is used as the axial center X), and the center C of the assembly member is, for example, closer to the second region S2 of the substrate 122a, such that the wavelength conversion device 120e may have a preferable structural balance effect. In other words, the assembly member 128e of the present embodiment is embodied as an eccentric structure having a uniform thickness for the wavelength conversion device 120e to achieve the preferable structural balance effect.

Figure 7A:
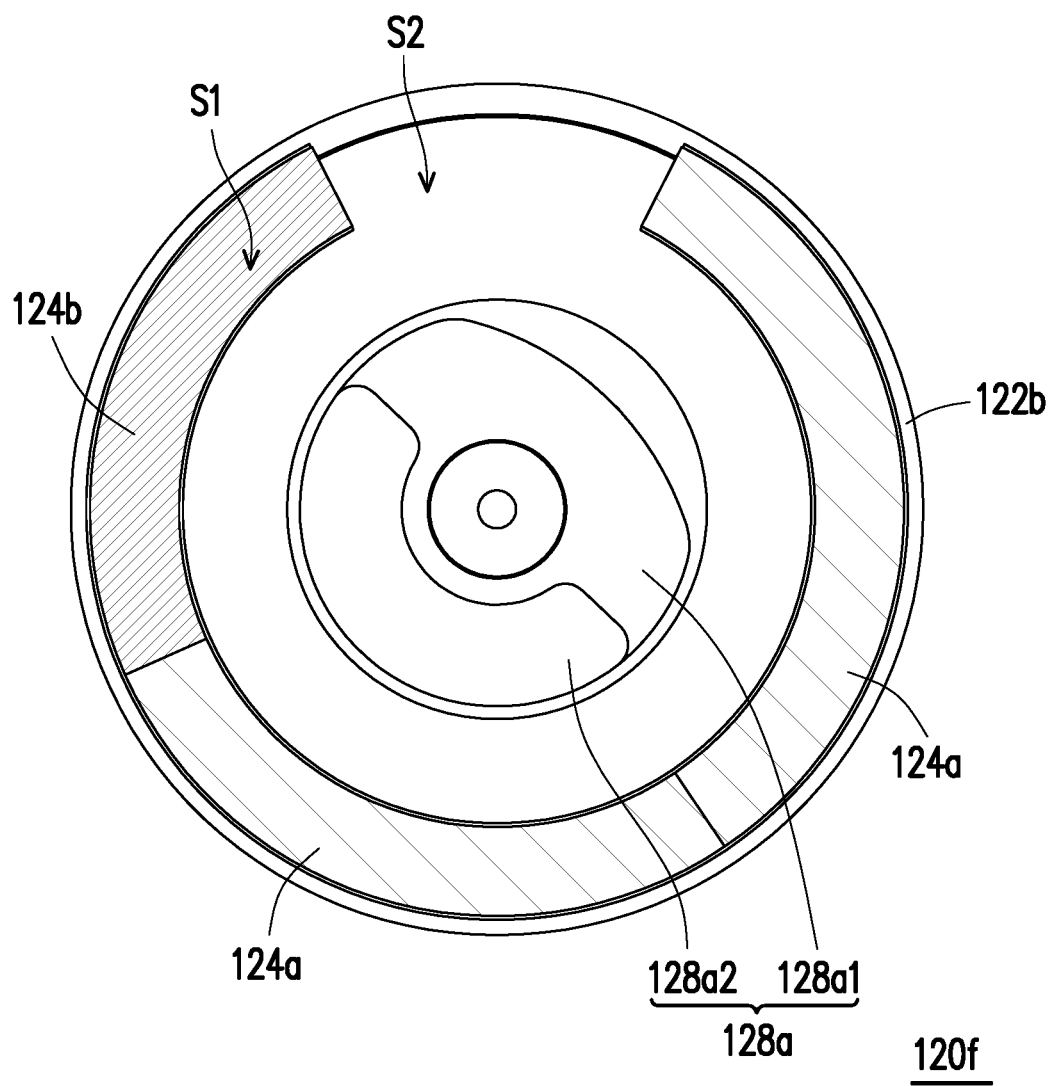
FIG. 7A is a front-view diagram illustrating a wavelength conversion device according to an embodiment of the invention.
Figure 7B:
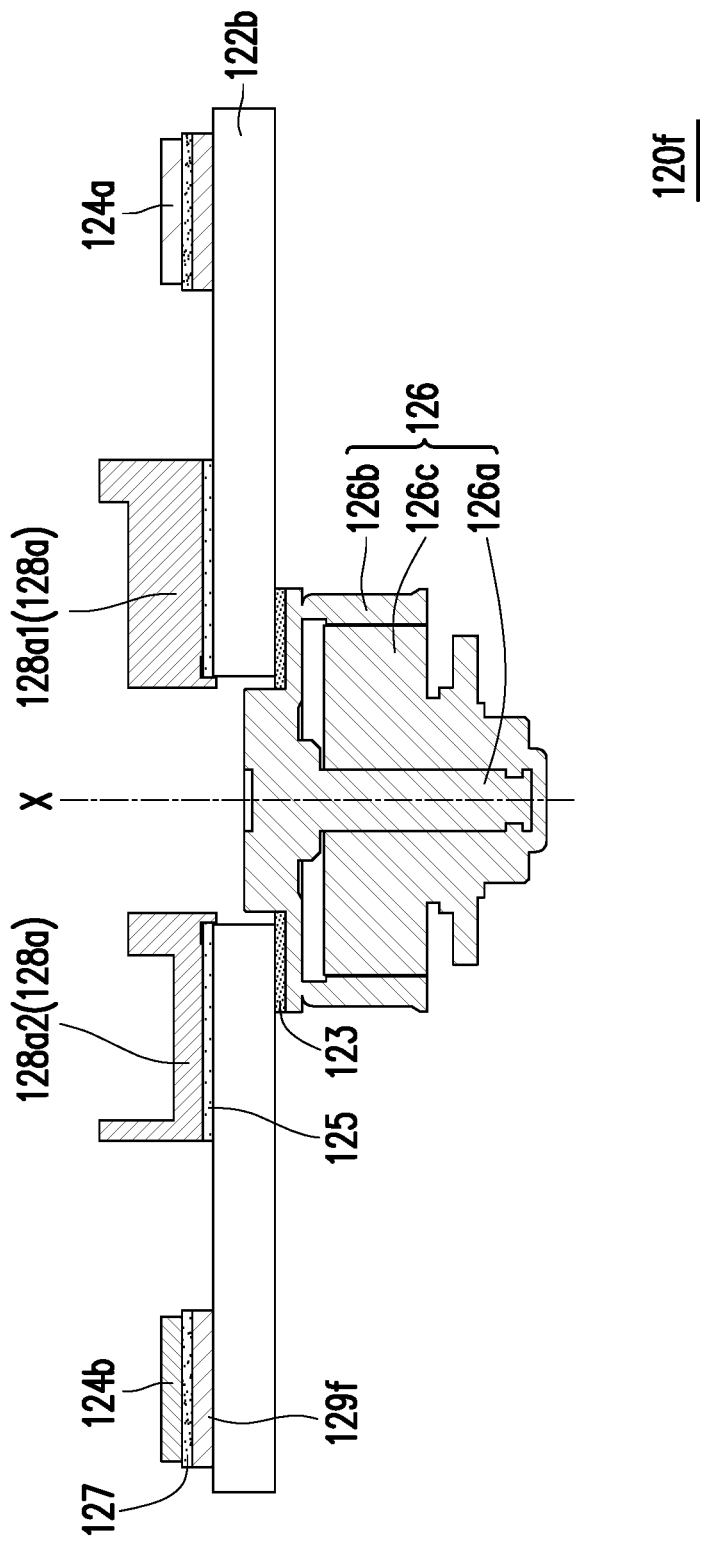
FIG. 7B is a cross-sectional diagram illustrating the wavelength conversion device depicted in FIG. 7A.

FIG. 7A is a front-view diagram illustrating a wavelength conversion device according to an embodiment of the invention. FIG. 7B is a cross-sectional diagram illustrating the wavelength conversion device depicted in FIG. 7A. Referring to FIG. 2C, FIG. 7A and FIG. 7B simultaneously first, a wavelength conversion device 120f of the present embodiment is similar to the wavelength conversion device 120a illustrated in FIG. 2C, and the difference between the two embodiments lies in that a substrate 122b of the present embodiment is made of a light transparent non-metal material, and since a second region S2 of the substrate 122b may serve as a non-wavelength conversion region and is embodied as a light transparent region without any reflective layer adhered thereto, the excitation beam L1 as illustrated in FIG. 1 after penetrating the second region S2 of the light transparent substrate 122b is transmitted to the light valve 200. Furthermore, the wavelength conversion device 120f of the present embodiment further includes a reflective layer 129f, the reflective layer 129f is disposed on the substrate 122b, located between the first wavelength conversion material layers 124a and the substrate 122b and located between the second wavelength conversion material layer 124b and the substrate 122b. An orthographic projection of the first part 128a1 of the assembly member 128a on the substrate 122b overlaps with the second region S2 of the substrate 122b.

Figure 8:
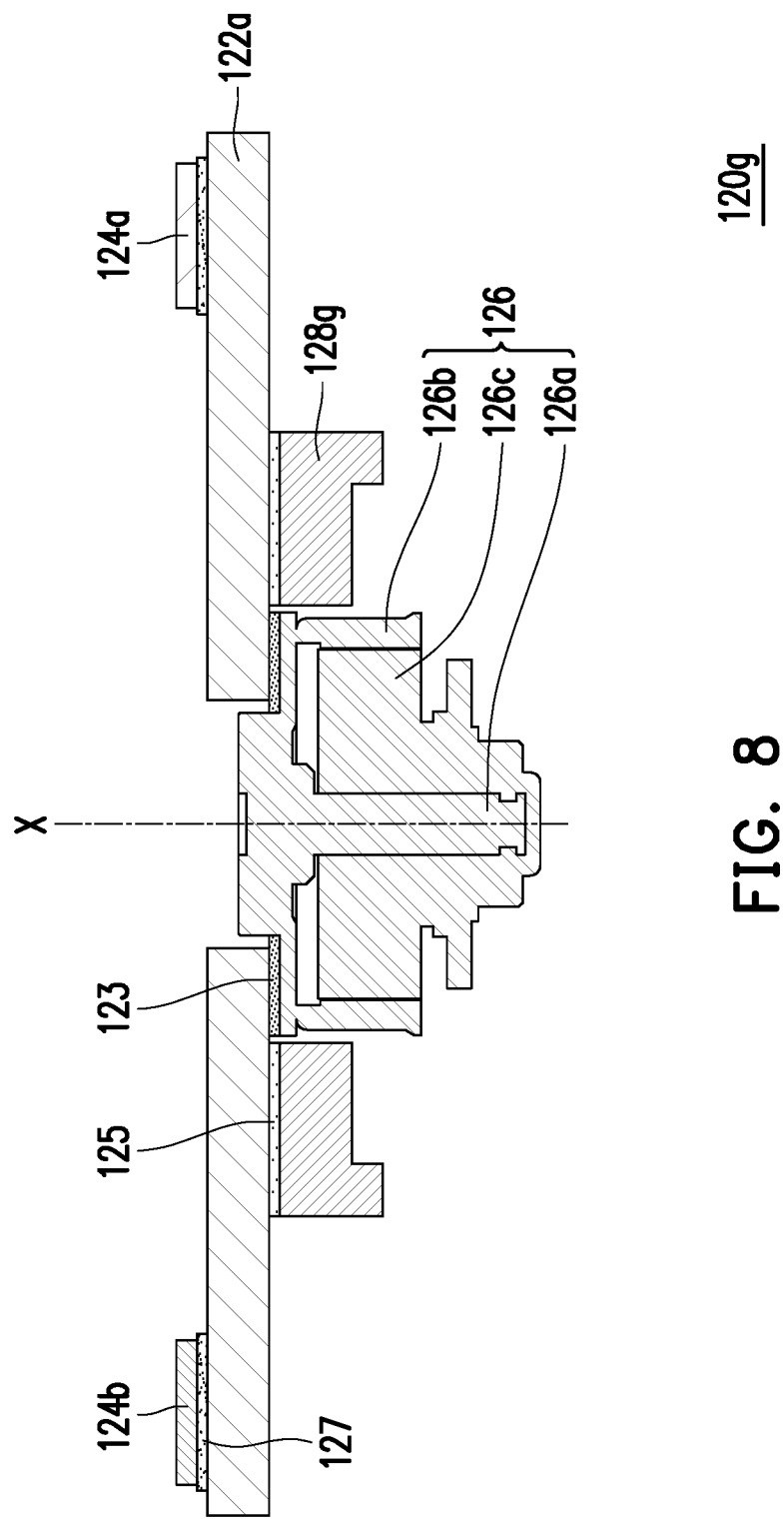
FIG. 8 is a cross-sectional diagram illustrating a wavelength conversion device according to another embodiment of the invention.

FIG. 8 is a cross-sectional diagram illustrating a wavelength conversion device according to another embodiment of the invention. Referring to both FIG. 3C and FIG. 8, a wavelength conversion device 120g of the present embodiment is similar to the wavelength conversion device 120b illustrated in FIG. 3C, and the difference between the two embodiments lies in that the assembly member of the present embodiment is a ring-shaped assembly member 128g. In detail, the ring-shaped assembly member 128g is disposed on the substrate 122a and located together with the driving unit 126 on the same side of the substrate 122a. The ring-shaped assembly member 128g is disposed coaxially with the axial center X of the driving unit 126, and the ring-shaped assembly member 128g surrounds the driving unit 126. The driving unit 126 is directly connected onto the substrate 122a through the adhesion layer 123, thereby reducing the noise and the wind resistance during the high-speed rotation.

Based on the above, the embodiments of the invention achieve at least one of the following advantages or effects. In the wavelength conversion device of the invention, the thickness or the shape of the assembly member is asymmetrical in the radial direction. Accordingly, the structural balance effect may be achieved without any known balancing sheet additionally disposed, and thus, the noise and the wind resistance may be reduced during high-speed rotation. Furthermore, as the disposition of the balancing sheet is unnecessary in the present embodiment, the structure centroid of the wavelength conversion device is closer to the center of the rotation shaft of the driving unit, such that the driving unit has an extended lifetime and generate low noise.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion device, configured to receive an excitation beam, comprising:
   a substrate, having a first region and a second region disposed adjacent to each other;
   at least one wavelength conversion material layer, disposed on the substrate and located in the first region, wherein the at least one wavelength conversion material layer is configured to convert a wavelength of the excitation beam;
   a light transparent plate, located in the second region of the substrate to be defined with the substrate as a disc shape;
   a driving unit, comprising a rotation shaft, wherein the driving unit is connected to the substrate and configured to drive the substrate to rotate with the rotation shaft as an axial center; and
   an assembly member, disposed on the substrate, wherein the substrate drives the assembly member to rotate, and a thickness or a shape of the assembly member is asymmetrical in a radial direction,
   wherein the assembly member at least has a first part and a second part, and a first thickness of the first part in the radial direction is greater than a second thickness of the second part in the radial direction, and the first thickness and the second thickness are greater than zero,
   wherein the substrate is disposed between the assembly member and the driving unit, an orthographic projection of the first part of the assembly member on the substrate overlaps with a part of the light transparent plate.

2. The wavelength conversion device according to claim 1, wherein the shape of the assembly member is a hollow-ring shape and is disposed coaxially with the axial center of the driving unit.

3. The wavelength conversion device according to claim 2, wherein an orthographic projection of the first part of the assembly member on the substrate overlaps with the second region of the substrate.

4. The wavelength conversion device according to claim 3, wherein a material of the substrate is a light transparent non-metal material.

5. The wavelength conversion device according to claim 4, further comprising:
   a reflective layer, disposed on the substrate and located between the at least one wavelength conversion material layer and the substrate.

6. The wavelength conversion device according to claim 2, further comprising:
   a filler, disposed on the assembly member.

7. The wavelength conversion device according to claim 2, wherein the second part of the assembly member has at least one through hole.

8. The wavelength conversion device according to claim 1, wherein a material of the substrate is different from a material of the light transparent plate, the substrate has a reflective surface, and the at least one wavelength conversion material layer is disposed on the reflective surface.

9. The wavelength conversion device according to claim 1, wherein when the shape of the assembly member is asymmetrical in the radial direction, a center of the assembly member deviates from the axial center of the driving unit.

10. The wavelength conversion device according to claim 1, wherein the assembly member and the driving unit are respectively located on the same side of the substrate.

11. The wavelength conversion device according to claim 10, wherein an inner diameter of the assembly member is greater than or equal to an outer diameter of the driving unit.

12. The wavelength conversion device according to claim 1, further comprising:
   an adhesion layer, dispose between the driving unit and the substrate, wherein the adhesion layer is directly connected to the driving unit and the substrate.

13. The wavelength conversion device according to claim 1, further comprising:
   an adhesion layer, dispose between the assembly member and the substrate, wherein the adhesion layer is directly connected to the driving unit and the substrate.

14. The wavelength conversion device according to claim 1, wherein a material of the assembly member comprises metal, plastic or ceramic.

15. The wavelength conversion device according to claim 1, wherein the at least one wavelength conversion material layer and the driving unit are respectively located on two opposite sides of the substrate.

16. A projector, comprising:
   an illumination system, configured to provide an illumination beam and comprising:
   an excitation light source device, configured to provide an excitation beam; and a wavelength conversion device, comprising:
     a substrate, having a first region and a second region disposed adjacent to each other;
     at least one wavelength conversion material layer, disposed on the substrate and located in the first region;
     a light transparent plate, located in the second region of the substrate to be defined with the substrate as a disc shape;
     a driving unit, comprising a rotation shaft, wherein the driving unit is connected to the substrate and configured to drive the substrate to rotate with the rotation shaft as an axial center; and
     an assembly member, disposed on the substrate, wherein the substrate drives the assembly member to rotate, and a thickness or a 'shape of the assembly member is asymmetrical in a radial direction,
     wherein the first region and the second region of the substrate enter a transmission path of the excitation beam in an alternate order, when the second region enters the transmission path of the excitation beam, the excitation beam is transmitted to the light valve, when the at least one wavelength conversion material layer located in the first region enters the transmission path of the excitation beam, the at least one wavelength conversion material layer converts a wavelength of the excitation beam, and the illumination beam comprises the excitation beam, and the assembly member at least has a first part and a second part, and a first thickness of the first part in the radial direction is greater than a second thickness of the second part in the radial direction, and the first thickness and the second thickness are greater than zero;

wherein the substrate is disposed between the assembly member and the driving unit, an orthographic projection of the first part of the assembly member on the substrate overlaps with a part of the light transparent plate;

a light valve, located on a transmission path of the illumination beam and configured to convert the illumination beam into an image beam; and a projection lens, located on a transmission path of the image beam and configured to convert the illumination beam into a projection beam.

17. A wavelength conversion device, configured to receive an excitation beam, and comprising:

a substrate, having a first region and a second region disposed adjacent to each other;

at least one wavelength conversion material layer, disposed on the substrate and located in the first region, wherein the at least one wavelength conversion material layer is configured to convert a wavelength of the excitation beam;

alight transparent plate, located in the second region of the substrate to be defined with the .substrate as a disc shape;

a driving unit comprising a rotation shaft, connected to the substrate and configured to drive the substrate to rotate with the rotation shaft as an axial center; and a ring-shaped assembly member, disposed on the substrate, located together with the driving unit on the same side of the substrate, disposed coaxially with the axial center of the driving unit and surrounding the driving unit, wherein the ring-shaped assembly member at least has a first part and a second part, and a first thickness of the first part in the radial direction is greater than a second thickness of the second part in the radial direction, and the first thickness and the second thickness are greater than zero, wherein the substrate is disposed between the ring-shaped assembly member and the driving unit, an orthographic projection of the first part of the ring-shaped assembly member on the substrate overlaps with a part of the light transparent plate.

18. The wavelength conversion device according to claim 17, further comprising:

an adhesion layer, dispose between the driving unit and the substrate, wherein the adhesion layer is directly connected to the driving unit and the substrate.

* * * * *